United States Patent
Sun

(10) Patent No.: US 8,714,520 B2
(45) Date of Patent: May 6, 2014

(54) UNIDIRECTIONAL CERAMIC CONTROL VALVE STRUCTURE

(75) Inventor: Tung-Hsin Sun, Taichung (TW)

(73) Assignee: Grand Advanced Technologies Co. Ltd., Taichung (TW)

( * ) Notice: Subject to any disclaimer, the term of this patent is extended or adjusted under 35 U.S.C. 154(b) by 172 days.

(21) Appl. No.: 13/460,534

(22) Filed: Apr. 30, 2012

(65) Prior Publication Data

US 2013/0284965 A1 Oct. 31, 2013

(51) Int. Cl.
*F16K 3/08* (2006.01)
*F16K 27/04* (2006.01)

(52) U.S. Cl.
USPC .................................. 251/208; 137/625.31

(58) Field of Classification Search
CPC .............. F16K 3/08; F16K 3/06; F16K 3/32; F16K 27/04; F16K 24/044; F16K 27/045; F16K 11/0743; F16K 11/074; F16K 3/10; F16K 3/029; F16K 3/0236
USPC ............. 251/208, 292, 314, 368; 137/625.17, 137/625.41, 625.3, 625.31, 614.11, 627
See application file for complete search history.

(56) References Cited

U.S. PATENT DOCUMENTS

| | | | | |
|---|---|---|---|---|
| 3,831,621 A * | 8/1974 | Anthony et al. | ............... | 137/270 |
| 4,651,770 A * | 3/1987 | Denham et al. | ............... | 137/270 |
| 4,793,375 A * | 12/1988 | Marty | ............ | 137/270 |
| 4,903,725 A * | 2/1990 | Ko | ............. | 137/454.5 |
| 5,190,077 A * | 3/1993 | Pawelzik et al. | ........ | 137/625.46 |
| 6,202,695 B1 * | 3/2001 | Wu | ............. | 137/625.3 |
| 6,247,496 B1 * | 6/2001 | Ko | ............. | 137/625.31 |
| 7,607,639 B2 * | 10/2009 | Chen et al. | .................... | 251/208 |
| 2011/0114865 A1 * | 5/2011 | Wu | ................ | 251/321 |

* cited by examiner

*Primary Examiner* — Elizabeth Houston
*Assistant Examiner* — David Colon Morales
(74) *Attorney, Agent, or Firm* — Che-Yang Chen; Law Office of Michael Chen

(57) ABSTRACT

A unidirectional ceramic control valve includes a valve shell, a shaft, a ring unit, an upper ceramic piece, a lower ceramic piece, a valve base and at least one anti-leak ring. Lower section of the valve shell has two hook holes, and two notches are formed therebelow. A receiving trough is formed at an inner portion of lower section of the shaft to provide a space for the ring unit and the upper ceramic piece. The ring unit is a ring-shaped body with low friction coefficient, and when the ring unit is disposed between the shaft and upper ceramic piece, it prevents the shaft from directly contacting the upper ceramic piece to generate wear. The upper ceramic piece has two symmetric water holes, while the lower ceramic piece has two symmetric circulating holes. A first protruding unit and a second protruding unit are correspondingly formed at the valve base.

4 Claims, 5 Drawing Sheets

UNIDIRECTIONAL CERAMIC CONTROL VALVE STRUCTURE

FIELD OF THE INVENTION

The present invention relates to a unidirectional ceramic control valve structure, and more particularly to a unidirectional ceramic control valve used to control on/off of the water flow and the amount of water.

BACKGROUND OF THE INVENTION

Conventionally, water-providing equipment usually has a precise ceramic valve inside to control on/off of the water flow and the amount of water. Most precision ceramic valves have a valve stick, upper ceramic piece, lower ceramic piece inside, and a valve base at the open end. The precision ceramic valve is usually installed in a receiving trough of the water providing equipment, and when the valve is in use, the valve stick protruding out from the valve shell is rotated, so that the valve stick can drive the upper ceramic piece to align the water hole with the circulating hole of the lower ceramic piece, and the water can flow in smoothly and flow out through the water outlet end. On the other hand, when the valve stick restores to its original position, the water hole of the upper ceramic piece evades the circulating hole of the lower ceramic piece, and the water is blocked through the misalignment of the upper and lower ceramic pieces.

However, there are some problem existing in conventional valve structure: (a) the upper ceramic piece directly contacts the valve stick, so when the valve stick rotates, both the valve stick and the ceramic piece are worn, and the life of the precision ceramic valve is shortened; and (b) a simple engagement between the valve shell and the valve base may not be secured. Thus, there remains a need for a new and improved ceramic control valve structure to overcome the problems stated above.

SUMMARY OF THE INVENTION

The problem to be solve is that the upper ceramic piece in conventional precision ceramic valve directly contacts the valve stick, so when the valve stick rotates, both the valve stick and the ceramic piece are worn, and the life of the precision ceramic valve is shortened. Also, a simple engagement between the valve shell and the valve base may not be secured.

To solve and overcome the problems stated above, the present invention provides a unidirectional ceramic control valve including a valve shell, a shaft, a ring unit, an upper ceramic piece, a lower ceramic piece, a valve base and at least one anti-leak ring. The lower section of the valve shell has two corresponding hook holes, and two notches are formed below the hook holes. The shaft is inserted into the valve shell, and an upper end of the shaft protrudes out the valve shell. A receiving trough is formed at an inner portion of the lower section of the shaft, and the receiving trough provides a space for the ring unit and the upper ceramic piece disposed in order, and a connecting recessed slot at the lower periphery of the shaft engages with a connecting block at the outer periphery of the upper ceramic piece, so that the upper ceramic piece can be driven to rotate. The ring unit is a ring-shaped body with low friction coefficient, and when the ring unit is disposed between the shaft and the upper ceramic piece, it prevents the shaft from directly contacting the upper ceramic piece to generate wear. The upper ceramic pieces has two symmetric water holes, and an expanding portion is formed at an upper portion of the water hole, so the diameter of the upper portion of the water hole is larger than that of the lower portion. The lower ceramic piece is disposed in the valve base, and two symmetric circulating holes are formed on the lower ceramic piece, and a second expanding portion is formed at a lower portion of the circulating hole, so the diameter of the lower portion of the circulating hole is larger than that of the upper portion. A protruding edge is formed at an outer periphery of the lower ceramic piece to secure it in the valve base. One side of the bottom of the valve base has a water inlet end, and the other side has a water outlet end, and a first protruding unit and a second protruding unit are correspondingly formed at the periphery of the valve base. Through the engaging slot at an inner surface of the first protruding unit and the second protruding unit, the lower ceramic piece can be engaged through the protruding edge so that the lower ceramic piece can be secured at the valve base. Also, the first protruding unit has a hook portion, and the second protruding unit has a stopping block, wherein the hook portion engages with the hook hole of the valve shell, while the stopping block engages with the notch, so that the valve base can be secured at the lower portion of the valve shell. When the valve base and the valve shell engage with each other, the lower ceramic piece can move upward to attach to the upper ceramic piece. The anti-leak ring is disposed between the valve base and the lower ceramic piece, so that the anti-leak ring is against the lower ceramic piece to form a water-stopping status. The anti-leak ring can also be simultaneously disposed underneath the valve base. Accordingly, a unidirectional ceramic control valve is obtained.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
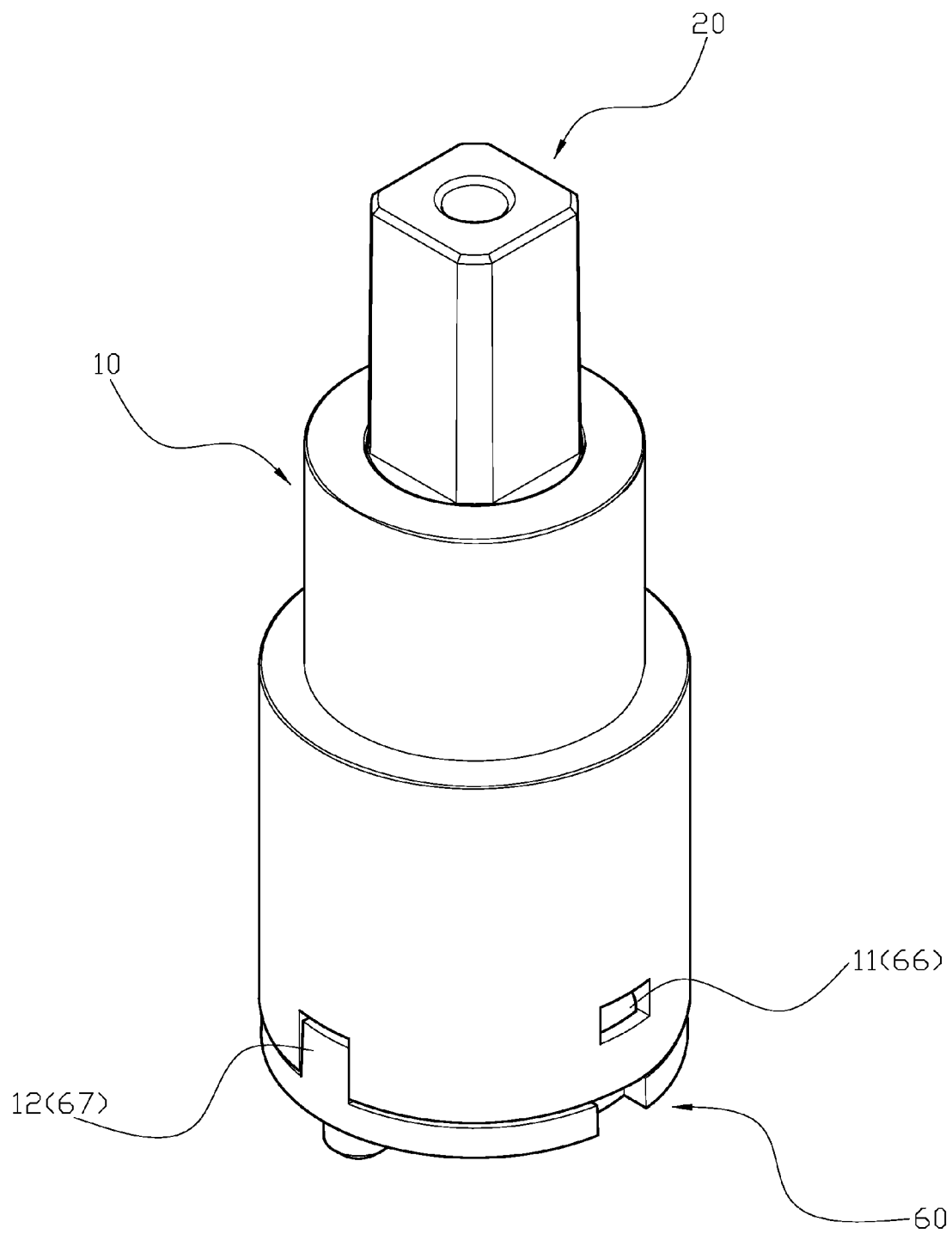
FIG. 1 illustrates a three-dimensional view in the present invention.
Figure 2:
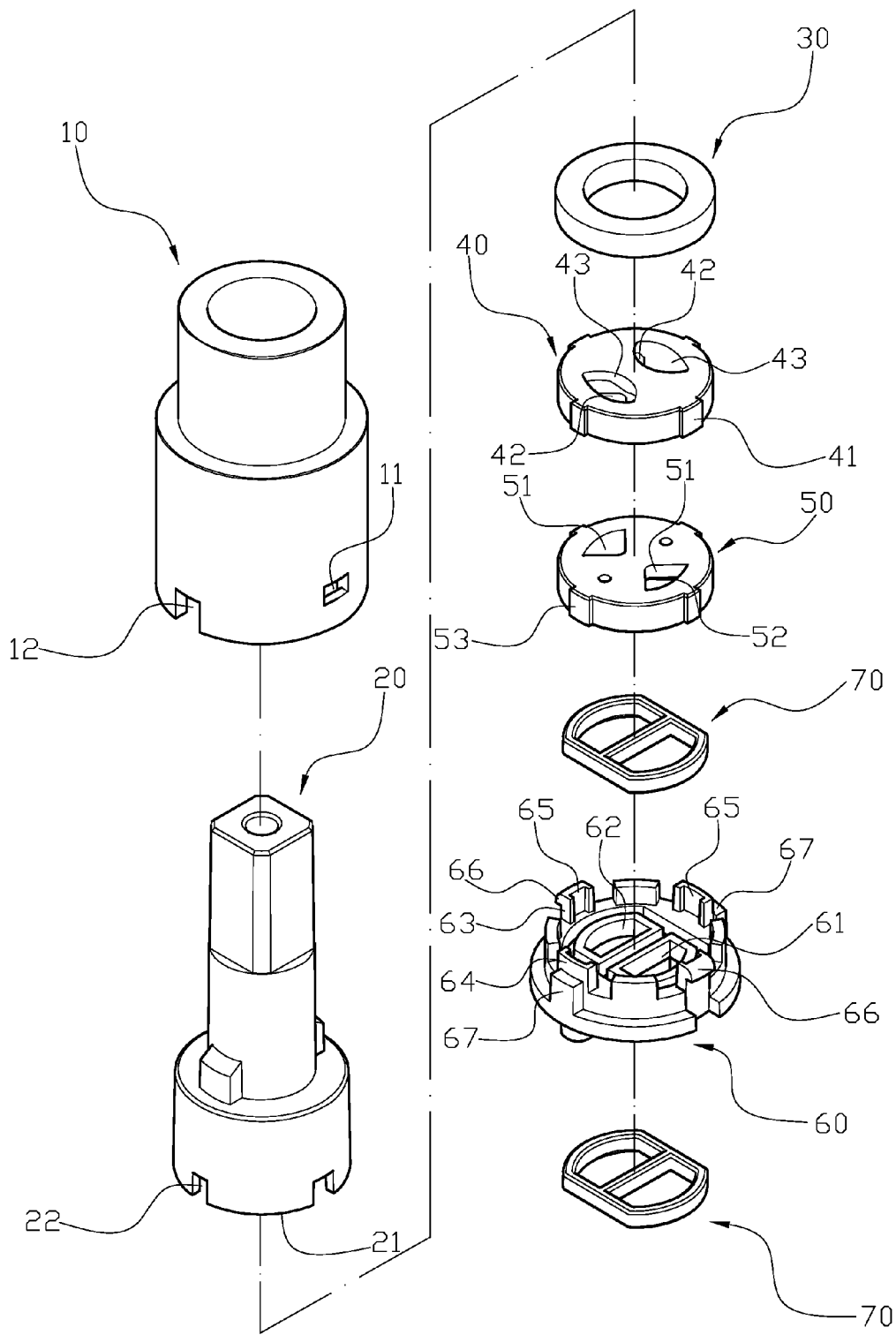
FIG. 2 illustrates a three-dimensional exploded view in the present invention.
Figure 3:
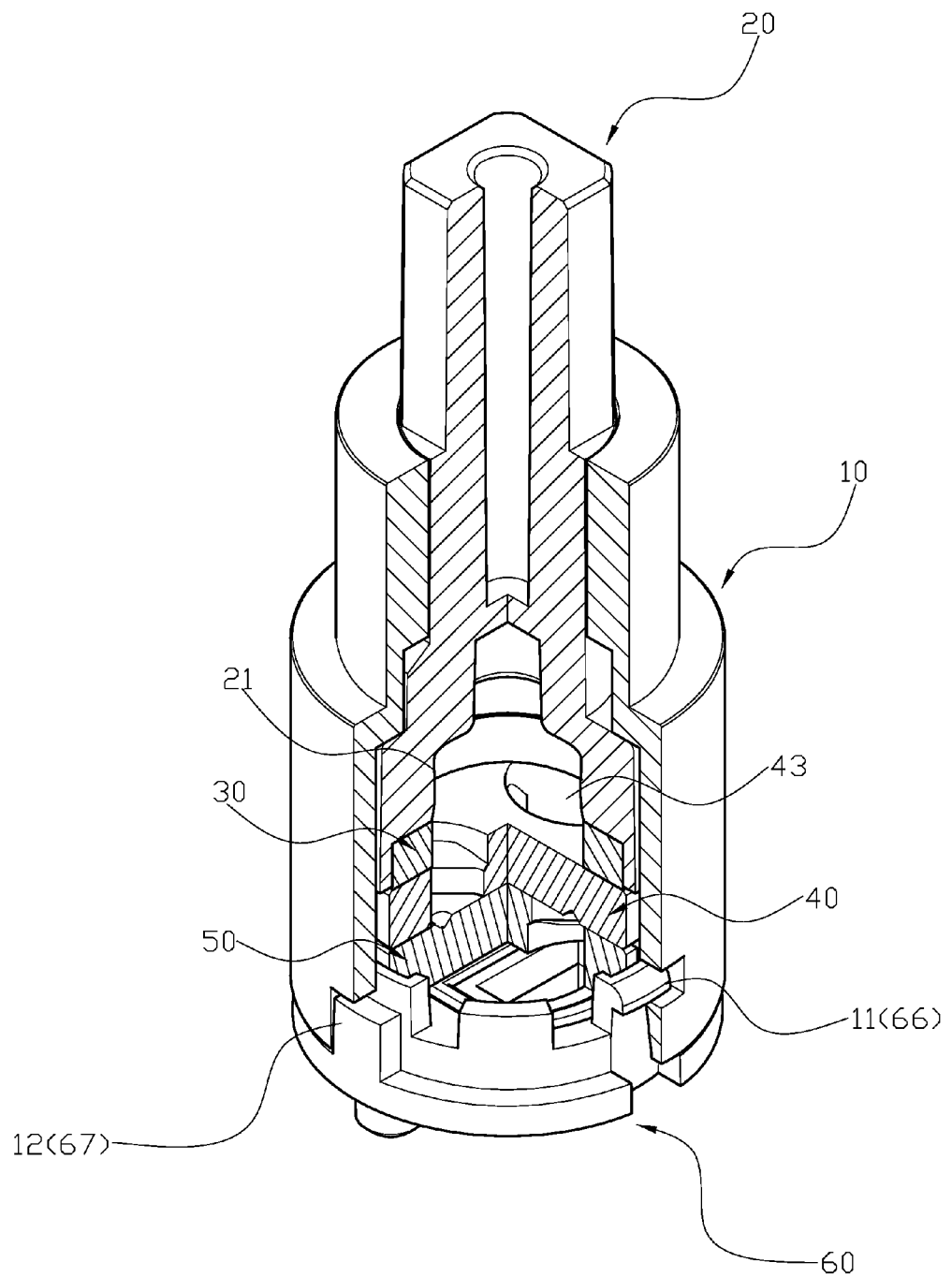
FIG. 3 illustrates a partial three-dimensional sectional view in the present invention.

In order to further understand the goal, characteristics and effect of the present invention, a number of embodiments along with the drawings are illustrated as following:

Referring to FIGS. 1 to 3, a unidirectional ceramic control valve includes a valve shell (10), a shaft (20), a ring unit (30), an upper ceramic piece (40), a lower ceramic piece (50), a valve base (60) and at least one anti-leak ring (70). The lower section of the valve shell (10) has two corresponding hook holes (11), and two notches (12) are formed below the hook holes (11). The shaft (20) is inserted into the valve shell (10), and an upper end of the shaft (20) protrudes out the valve shell (10). A receiving trough (21) is formed at an inner portion of the lower section of the shaft (20), and the receiving trough (21) provides a space for the ring unit (30) and the upper ceramic piece (40) orderly disposed, and a connecting recessed slot (22) at the lower periphery of the shaft (20) engages with a connecting block (41) at the outer periphery of the upper ceramic piece (40), so that the upper ceramic piece (40) can be driven to rotate. The ring unit (30) is a ring-shaped body with low friction coefficient, and when the ring unit (30) is disposed between the shaft (20) and the upper ceramic piece (40), it prevents the shaft (20) from directly contacting the upper ceramic piece (40) to generate wear. The upper ceramic pieces (40) has two symmetric water holes (42), and an expanding portion (43) is formed at an upper portion of the water hole (42), so the diameter of the upper portion of the water hole (42) is larger than that of the lower portion. The lower ceramic piece (50) is disposed in the valve base (60), and two symmetric circulating holes (51) are formed on the lower ceramic piece (50), and a second expanding portion (52) is formed at a lower portion of the circulating hole (51), so the diameter of the lower portion of the circulating hole (51) is larger than that of the upper portion. A protruding edge (53) is formed at an outer periphery of the lower ceramic piece (50) to secure it in the valve base (60). One side of the bottom of the valve base (60) has a water inlet end (61), and the other side has a water outlet end (62), and a first protruding unit (63) and a second protruding unit (64) are correspondingly formed at the periphery of the valve base (60). Through an engaging slot (65) at an inner surface of the first protruding unit (63) and the second protruding unit (64), the lower ceramic piece (50) can be engaged through the protruding edge (53) so that the lower ceramic piece (50) can be secured at the valve base (60). Also, the first protruding unit (63) has a hook portion (66), and the second protruding unit (64) has a stopping block (67), wherein the hook portion (66) engages with the hook hole (11) of the valve shell (10), while the stopping block (67) engages with the notch (12), so that the valve base (60) can be secured at the lower portion of the valve shell (10). When the valve base (60) and the valve shell (10) engage with each other, the lower ceramic piece (50) can move upward to attach to the upper ceramic piece (40). The anti-leak ring (70) is disposed between the valve base (60) and the lower ceramic piece (50), so that the anti-leak ring (70) is against the lower ceramic piece (50) to form a water-stopping status. The anti-leak ring (70) can also be simultaneously disposed underneath the valve base (60).

Figure 4:
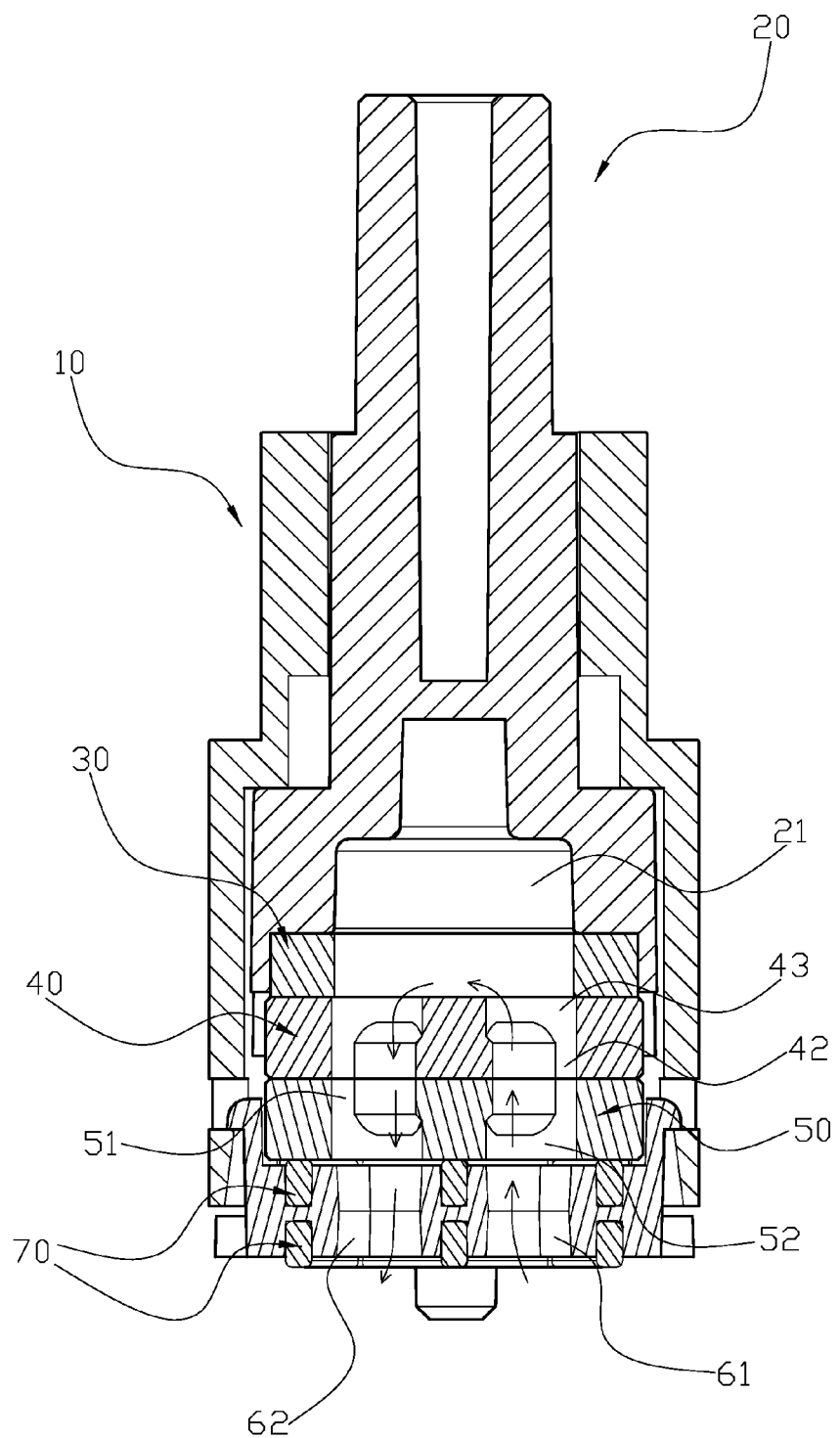
FIG. 4 illustrates the status of water being used in the present invention.
Figure 5:
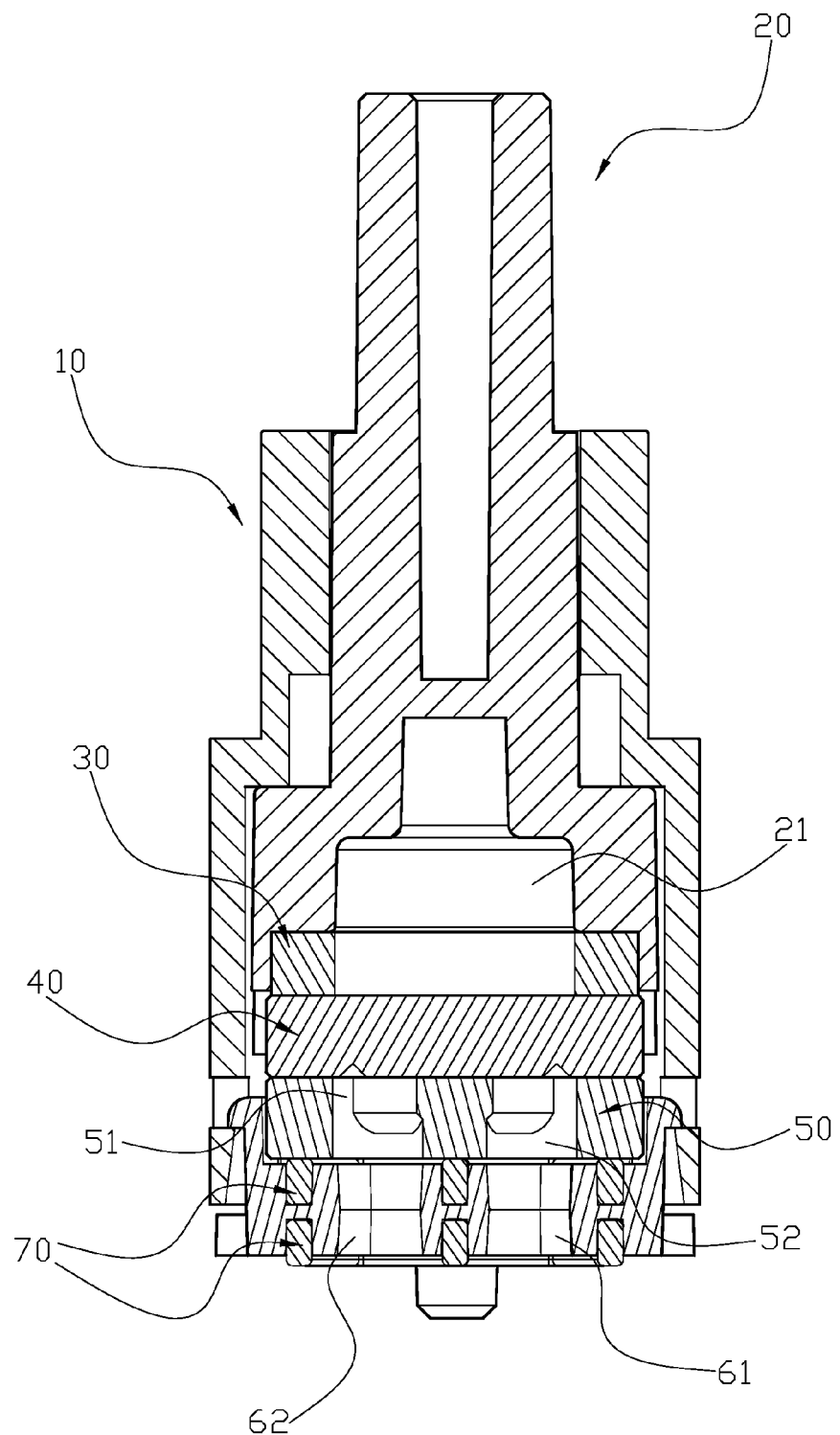
FIG. 5 illustrates the status of water being stopped in the present invention.

When the valve is in use, the shaft (20) is driven to rotate by the handle of the water source, and the upper ceramic piece (40) is simultaneously driven to rotate by the connecting recessed slot (22). When it rotates, the water hole (42) of the upper ceramic piece (40) gradually aligns with the circulating hole (51) of the lower ceramic piece (50), and the amount of water from the water inlet end (61) of the valve base (60) can be adjusted through the alignment. When the water flows through the circulating hole (51) of the lower ceramic piece (50) and the water hole (42) of the upper ceramic piece (40), the water passes through the receiving trough (21), the other water hole (42), the other circulating hole (51), and flows out through the water outlet end (62) of the valve base (60) (also see FIG. 4). On the other hand, when the shaft (20) is restored to the original position, the water hole (42) of the upper ceramic piece (40) evades the circulating hole (51) of the lower ceramic piece (50), so that the water is stopped through the misalignment of the upper (40) and lower (50) ceramic pieces (also see FIG. 5) to shut off the water source.

According to the embodiments discussed above, the present invention has following advantages: (a) the ring unit (30) is disposed between the shaft (20) and the upper ceramic piece (40), and it prevents the shaft (20) from directly contacting the upper ceramic piece (40) to generate wear, so the unidirectional ceramic control valve has better durability; (b) the hook portion (66) of the valve base (60) engages with the hook hole (11) of the valve shell (10), while the stopping block (67) engages with the notch (12), so that the valve base (60) can be secured on the valve shell (10) to prevent and solve the problem of shaking, moving after the valve base (60) has been secured on the valve shell (10); and (c) the upper portion of the water hole (42) and the lower portion of the circulating hole (51) have the expanding portion (43) and the second expanding portion (52), respectively, to increase the amount of water input and output, so that the user does not have to wait for a long period of time for water.

Having described the invention by the description and illustrations above, it should be understood that these are exemplary of the invention and are not to be considered as limiting. Accordingly, the invention is not to be considered as limited by the foregoing description, but includes any equivalent.

What is claimed is:

1. A unidirectional ceramic control valve comprising: a valve shell, a shaft, a ring unit, an upper ceramic piece, a lower ceramic piece, a valve base and at least one anti-leak ring, wherein lower section of the valve shell has two corresponding hook holes, and two notches are formed below the hook holes;

wherein the shaft is inserted into the valve shell, an upper end of the shaft protruding out the valve shell, and a receiving trough is formed at an inner portion of the lower section of the shaft, the receiving trough providing a space for the ring unit and the upper ceramic piece disposed in order, and lower periphery of the shaft engages with the upper ceramic piece, so that the upper ceramic piece is driven to rotate by the shaft;

wherein the ring unit is a ring-shaped body with low friction coefficient, and when the ring unit is disposed between the shaft and the upper ceramic piece, it prevents the shaft from directly contacting the upper ceramic piece to generate wear;

wherein the upper ceramic pieces has two symmetric water holes, and an expanding portion is formed at an upper portion of the water hole, so diameter of the upper portion of the water hole is larger than that of the lower portion of the water hole;

wherein the lower ceramic piece is disposed in the valve base, and two symmetric circulating holes are formed on the lower ceramic piece, and a second expanding portion is formed at a lower portion of the circulating hole, so the diameter of the lower portion of the circulating hole is larger than that of the upper portion of the circulating hole;

wherein one side of the bottom of the valve base has a water inlet end, the other side having a water outlet end, and a first protruding unit and a second protruding unit are correspondingly formed at the periphery of the valve base, the first protruding unit having a hook portion, the second protruding unit having a stopping block, and the hook portion engages with the hook hole of the valve shell, while the stopping block engages with the notch, so that the valve base is secured at the lower portion of the valve shell, and the lower ceramic piece is allowed to move upward to attach to the upper ceramic piece; and wherein the anti-leak ring is disposed between the valve base and the lower ceramic piece, so that the anti-leak ring is against the lower ceramic piece to form a water-stopping status.

2. The unidirectional ceramic control valve of claim 1, wherein a connecting recessed slot at a lower periphery of the shaft engages with a connecting block at an outer periphery of the upper ceramic piece, so that the upper ceramic piece is driven to rotate by the shaft.

3. The unidirectional ceramic control valve of claim 1, wherein a protruding edge is formed at an outer periphery of the lower ceramic piece, and an engaging slot is formed at an inner surface of the first protruding unit and the second protruding unit, and the protruding edge of the lower ceramic piece engages with the protruding edge, so that the lower ceramic piece is secured at the valve base.

4. The unidirectional ceramic control valve of claim 1, wherein the anti-leak ring is allowed to dispose underneath the valve base.

* * * * *